Patented Sept. 30, 1924.

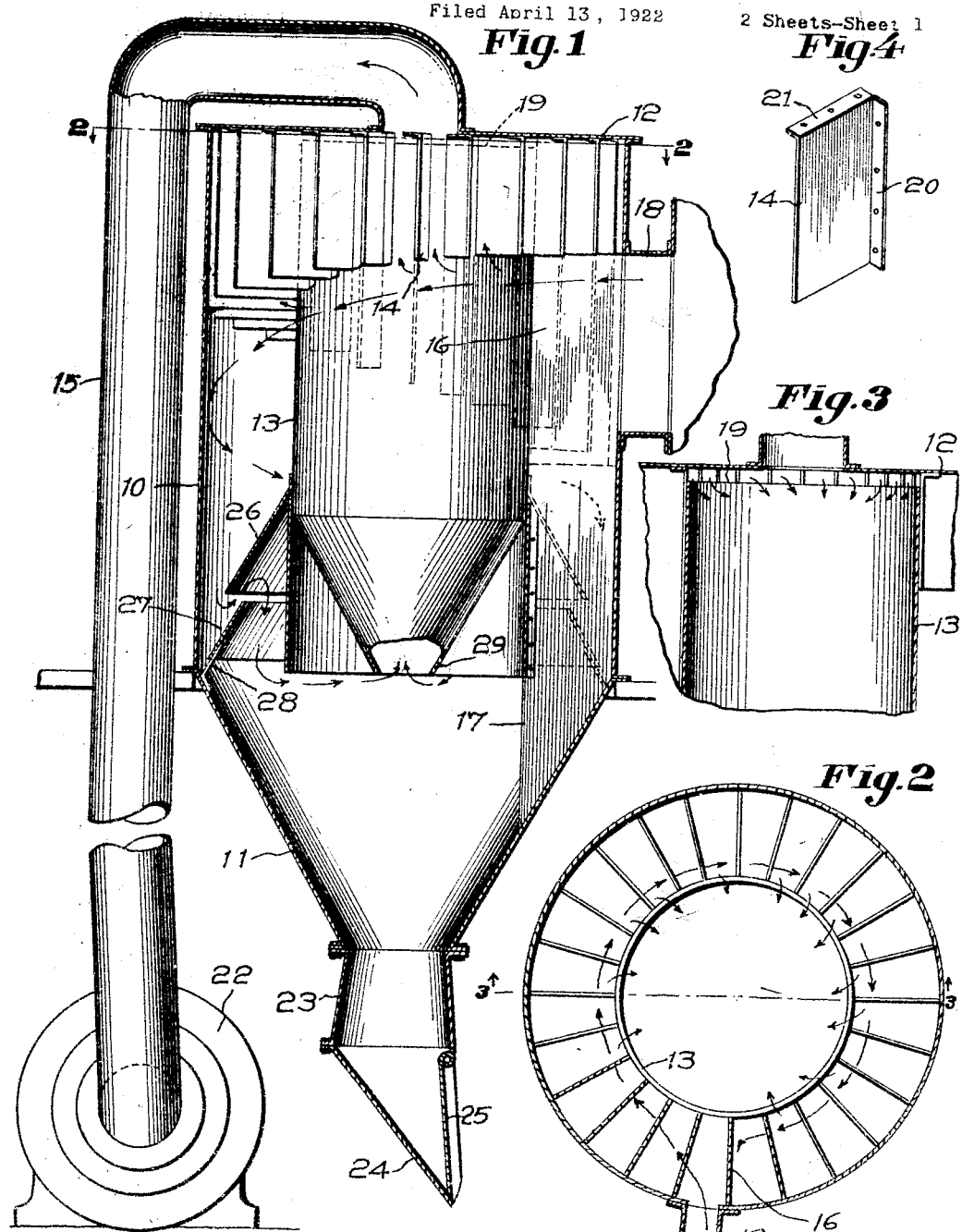

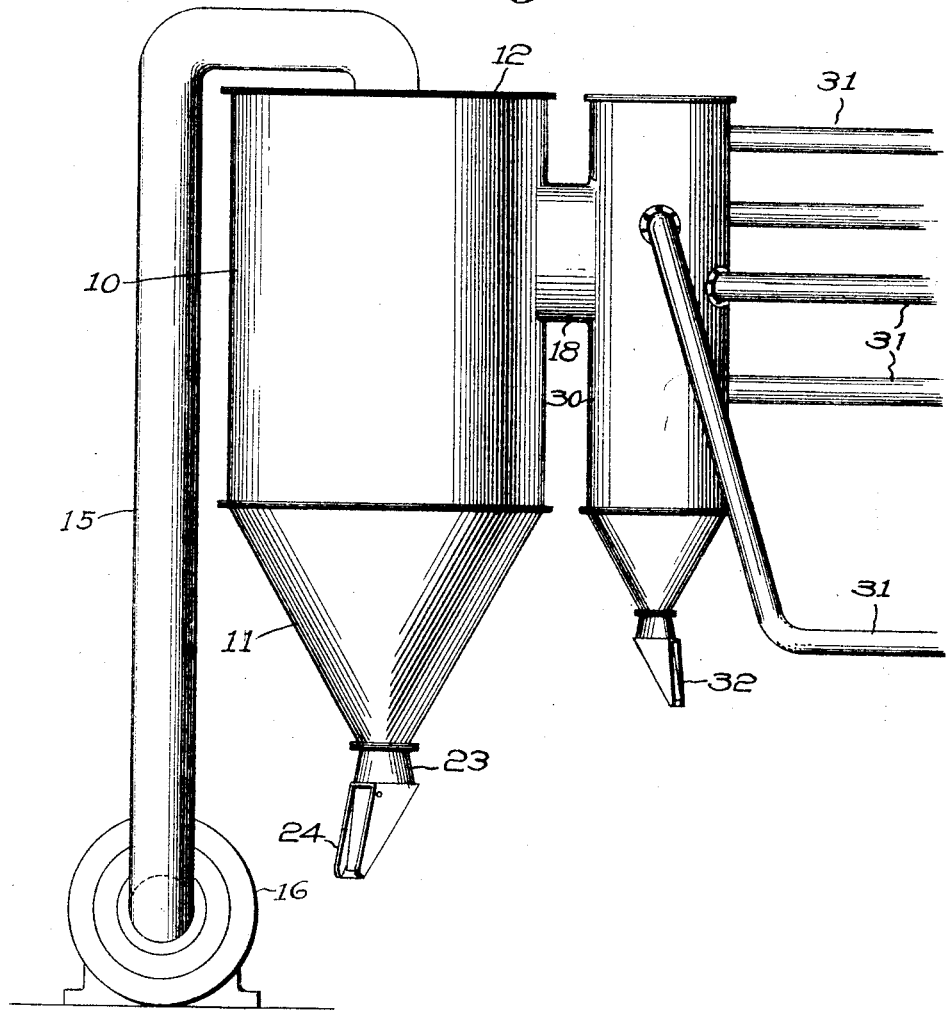

1,509,910

UNITED STATES PATENT OFFICE.

ALBERT H. STEBBINS, OF LOS ANGELES, CALIFORNIA.

DUST COLLECTOR.

Application filed April 13, 1922. Serial No. 552,175.

*To all whom it may concern:*

Be it known that I, ALBERT H. STEBBINS, a citizen of the United States, residing at Los Angeles, in the county of Los Angeles and State of California, have invented an Improvement in Dust Collectors, of which the following description, in connection with the accompanying drawings, is a specification, like characters on the drawings representing like parts.

This invention relates to dust collectors, and more particularly to the suction type of dust collector wherein dust laden air is drawn into a dust collecting chamber by exhausting the air therein.

Dust collectors of the blast type, wherein dust laden air is blown into a collecting chamber are well known and are used for various purposes. In dust collectors of the blast type the dust laden air passes through a blast fan on its way to the collecting chamber, and if the dust is heavy it is very destructive to the fan blades. It may therefore be desirable in many cases to pass the heavy air through a suction dust collector, in accordance with the present invention, to remove the heavier dust before it reaches the fan. Then if more complete removal of the dust is desired, the air from the suction dust collector may be passed through a blast collector. However the suction dust collector of the present invention may be used independently of the blast dust collector, and various features of the present invention are well adapted for use in either the suction or blast type of dust collector.

Dust may be removed from the air within the dust collector, in accordance with the present invention, by imparting a whirling movement to the air so that the heavier particles will be thrown outwardly by centrifugal force, and by reducing the velocity of the dust bearing air and gently abstracting the air at various points so that the suspended dust will settle downwardly.

One important feature of the present invention, therefore, resides in means for sucking dust laden air into a dust collecting chamber and for gently removing the air from the collecting chamber at a multiplicity of points.

Another feature of the invention resides in means for imparting a whirling movement to the air within the collecting chamber so that the heavier particles will be thrown outwardly by centrifugal force.

Other features of the invention and novel combination of parts in addition to the above will be hereinafter described in connection with the accompanying drawings which illustrate one good practical form thereof.

In the drawings:

Fig. 1 is a vertical sectional view through a dust collector constructed in accordance with the present invention.

Fig. 2 is a sectional view taken on line 2—2 of Fig. 1.

Fig. 3 is a sectional view taken on line 3—3 of Fig. 2.

Fig. 4 is a perspective view of one of the vanes; and

Fig. 5 is a side elevation of the dust collector of Fig. 1 showing an auxiliary drum connected thereto.

In the embodiment of the invention illustrated in the drawings, a drum or casing 10 is provided having a conical lower end 11 and a cover plate 12 at its upper end. Within the drum 10 is mounted a tube or core 13 extending longitudinally thereof in spaced relation to the walls of the drum. Within the upper part of the drum 10 are provided a series of vanes 14 extending radially outwardly from the tube toward the drum. The arrangement is such that the air that enters the drum passes upwardly between the vanes 14 and escapes from the upper end of the drum through the suction conduit 15.

It is desirable to impart a whirling movement to the air within the drum so that the particles within the air will be thrown outwardly by centrifugal force. To this end, a partition 16 is provided between the tubes 13 and the wall of the drum 10, and this partition preferably extends from near the upper end of the drum downwardly into the cone portion 11 as at 17. The dust laden air is led into the drum 10 at one side of the partition 16 through the conduit 18, and since the partition arrests the movement of the air in one direction, it will pass around the tube 13 in the other direction as indicated by the arrows in Fig. 2. The movement of the air about the tube 13 is produced by the flow of the air towards the different vanes arranged about the tube and the passage of the air upwardly between the vanes.

The space between each pair of vanes 14 communicates with the exhaust conduit 15, and to this end in the construction shown, the upper end of the tube 13 terminates a short distance from the cover 12 as at 19. The vanes 14 may have flanges 20 and 21 secured to the tube and cover respectively. In some cases it may be desirable to increase progressively the length of the vane 14 downwardly, as shown, so that the lower ends of the vanes will form a spiral path passing around the tube 13 from one side of the partition 16 to the other. In the construction shown the conduit 18 enters the drum 10 to the left of the partition 16, viewing Fig. 2, and at a point adjacent the shortest vanes, and as the air passes around the tube 13 it will be deflected downward somewhat by the increasing length of the vanes as indicated by the arrows in Fig. 1, but it is not essential in all constructions that the air travel in a downwardly inclined direction as it passes around the tube 13.

The conduit 15 communicating with the top of the drum 10 may be connected to a fan 22 or other exhaust means, and the dust that settles in the drum 10 will pass downwardly into the receptacle 23 at the lower end of the cone portion and pass out through the discharge opening 24. A swinging trap 25 preferably is provided to prevent air from entering through the discharge opening 24.

It is desirable to arrest the downwardly whirling air before it enters the cone 11, and to this end, baffle plates 26 and 27 are provided surrounding the tube 13, one of these baffle plates may be secured to the tube 13 as shown while the other may be supported adjacent the inner wall of the drum 10 by brackets 28. The air that finds its way into the cone-shaped portion 11 of the drum may enter the lower end of the tube 13 and pass upwardly therethrough, and the lower end of this tube preferably is contracted as at 29 to reduce the flow of air upwardly therethrough.

In the operation of the present device the conduit 18 may be connected with one or more devices from which dust is to be removed, and as air is exhausted within the conduit 15 by the fan 22 air will be gently drawn upwardly between the multiplicity of vanes 14. This exhausts the air within the drum 10 and causes the particles of dust to settle downwardly in the lower portion of the drum. Withdrawal of the air from between the different vanes also promotes a whirling movement of the air as above pointed out, which serves to throw the heavier particles outwardly against the wall of the drum, whereupon they fall downwardly.

In cases where a plurality of pipes is provided to carry dust laden air to the dust remover, it is desirable to provide an auxiliary drum or receptacle 30 connected to the conduit 18, as shown in Fig. 5, since if these pipes are connected directly to the conduit 18 they will deposit objectionable dust bars therein. Any desired number of pipes 31 may be provided leading into the auxiliary drum 30 and the dust that settles therein may be discharged through the opening 32 at the lower end thereof. The fan 16 will serve to exhaust air from the drum 10, the auxiliary drum 30 and the pipes 31, and the drum 10 preferably has a relatively large diameter so that air may be withdrawn therefrom upwardly between the vanes 13 throughout a relatively large area.

What is claimed is:

1. A dust collector comprising, in combination, a drum having dust receiving means at its lower end, a tube extending longitudinally within the drum and having an opening at its upper end for the passage of air from the drum, a series of radially disposed vanes within the upper end of the drum and extending outwardly from the tube, means for introducing air into the drum to pass around the tube and upwardly between the vanes, and means for conducting the air that passes up between the vanes through said opening and out of the drum.

2. A dust collector comprising, in combination, a drum having dust receiving means at its lower end, a tube extending longitudinally within the drum and having an opening at its upper end for the passage of air from the drum, a series of vanes within the upper end of the drum surrounding the tube and extending outwardly therefrom toward the wall of the drum, means for introducing air into the drum to pass around the tube and upwardly between the vanes, and means for conducting the air that passes up between the vanes through said opening and out of the drum.

3. A dust collector comprising, in combination, a drum having a cover at its upper end and dust receiving means at its lower end, a tube disposed centrally within the drum, a series of vanes surrounding the tube and extending downwardly within the drum from said cover, means for introducing air into the drum through a lateral wall thereof to pass around the tube and upwardly between the vanes, and suction means for removing at the upper end of the vanes the air that passes upwardly between the vanes.

4. A dust collector comprising, in combination, a drum having dust receiving means at its lower end, a tube disposed centrally within the drum, a series of vanes surrounding the tube and extending between it and the drum, a partition extending between the drum and tube lengthwise of the drum, means for introducing air into the drum near the partition to pass about the tube from one side of the partition to the other and upwardly between the vanes, and means for conducting the air that passes up between the vanes from the drum.

5. A dust collector comprising, in combination, a drum having dust receiving means at its lower end, a tube disposed centrally within the drum, a series of vanes surrounding the tube at the upper end of the drum and extending outwardly toward the wall of the drum, a conduit for conducting dust laden air into the space between the tube and drum, and suction means at the upper end of the drum for drawing air upwardly between said vanes in the space between the tube and drum and out of the drum.

6. A dust collector comprising, in combination, a drum having dust receiving means at its lower end, a tube disposed centrally within the drum, a series of vanes surrounding the tube and extending outwardly toward the drum, a partition extending between the drum and tube lengthwise of the drum, a conduit for delivering dust laden air into the drum at one side of said partition, and suction means at the upper end of the drum for causing the air to pass around the tube and upward between the vanes out of the drum.

7. A dust collector comprising, in combination, a drum having dust receiving means at its lower end, a tube disposed centrally within the drum, a partition extending between the drum and tube lengthwise of the drum, a series of vanes disposed radially between the tube and drum and increasing successively in length in a downward direction to form a spiral course extending around the tube from one side of the partition to the other, a conduit for delivering dust laden air to the drum at one side of the partition, and suction means at the upper end of the drum for drawing air around said spiral course and upwardly between the vanes.

8. A dust collector comprising, in combination, a drum having dust receiving means at its lower end, a tube disposed centrally within the drum, a partition extending longitudinally of the drum and between it and the tube, means for delivering dust laden air into the drum at one side of said partition, suction means at the upper end of the drum for removing air therefrom, and vanes arranged about the tube to impart a rotary movement to the air as it enters the successive spaces between the vanes and passes upward to the suction means.

9. A dust collector comprising, in combination a drum having dust receiving means at its lower end, a tube disposed centrally within the drum, means for conducting dust laden air into the space between the drum and tube, suction means for drawing air into said space and for exhausting it therefrom at the upper end of the space, and vanes within the upper portion of said drum and arranged to effect whirling movement of the air about the tube as the air passes between the vanes toward the suction means.

10. A dust collector comprising, in combination, a drum having dust receiving means at its lower end, a tube disposed centrally within the drum, means for conducting dust laden air into the space between the drum and tube, suction means for drawing air into said space and for exhausting it therefrom at the upper end of the space, vanes within the upper portion of the drum and arranged to effect whirling movement of the air about the tube as the air passes between the vanes toward the suction means, and baffle means in the lower portion of the drum for arresting downward movement of the air therein.

11. A dust collector comprising, in combination a drum having a central core therein, a series of vanes of progressively increasing lengths within the upper part of the drum and extending downwardly within the space between the drum and tube to form partitions between which the air rises, means for conducting dust laden air into the drum below said vanes, and means for exhausting air from between the vanes at the upper end of the drum gently to abstract the air within the drum from the suspended dust.

12. A dust collector comprising in combination, a drum having a central core therein extending throughout the greater portion of the drum, a partition extending between the drum and core lengthwise of the drum throughout the greater portion of the drum, a conduit for delivering dust ladened air into the drum to one side of said partition, means within the space between the drum and core for directing the dust laden air downwardly along a spiral path and means within the upper portion of the drum for exhausting air from the drum at a multiplicity of different points gently to abstract the air within the drum from the suspended dust, and said points being positioned so that the air will travel about the core with a whirling movement as it travels toward the different exhaust points.

13. A dust collector comprising, in combination, a drum having dust receiving means at its lower end, a tube disposed centrally within the drum, a series of vanes surrounding the tube and extending outwardly toward the drum, a partition extending between the drum and tube lengthwise of the drum, a conduit for delivering dust laden air into the drum at one side of said partition, and means for imparting a whirling movement to the air within the drum to cause it to pass around said tube and upwardly between the vanes out of the drum.

14. A dust collector comprising, in combination a container having a closed upper end and means for discharging dust from its lower end, a tube for conducting air from the drum and extending downwardly from the upper end of the drum a substantial distance, means for introducing dust laden air into the upper portion of the drum to whirl about the tube, and a series of vanes of progressively increasing lengths within the upper part of the drum and extending downwardly within the space between the drum and tube to direct the whirling air downwardly.

In testimony whereof, I have signed my name to this specification.

ALBERT H. STEBBINS.